United States Patent [19]

Lockshaw

[11] 4,103,368
[45] Aug. 1, 1978

[54] POOL COVER HAVING SOLAR ENERGY HEATING FEATURE

[75] Inventor: James J. Lockshaw, Huntington Beach, Calif.

[73] Assignee: Tolo, Incorporated, Santa Ana, Calif.

[21] Appl. No.: 704,301

[22] Filed: Jul. 12, 1976

[51] Int. Cl.² .......................... E04H 3/19; F24J 3/02
[52] U.S. Cl. .................... 4/172.12; 126/271
[58] Field of Search .............. 4/172, 172 C, 172.11, 4/172.12, 172.13, 172.14, 178, 180; 52/2, 108; 126/270, 271; 34/93; 46/44

[56] References Cited

U.S. PATENT DOCUMENTS

| | | | |
|---|---|---|---|
| 3,072,920 | 1/1963 | Yellott | 4/172 |
| 3,174,915 | 3/1965 | Edlin | 127/271 X |
| 3,298,142 | 1/1967 | Issac | 52/108 X |
| 3,747,132 | 7/1973 | Foster | 4/172.14 |
| 3,859,980 | 1/1975 | Crawford | 126/271 |
| 3,885,255 | 5/1975 | Vorbach et al. | 4/172.14 |
| 3,893,443 | 7/1975 | Smith | 126/271 |
| 3,908,631 | 9/1975 | Rom | 52/2 X |
| 3,927,427 | 12/1975 | Aine | 4/172.14 |

FOREIGN PATENT DOCUMENTS 16,641 of 1895 United Kingdom ............... 46/44

Primary Examiner—Richard E. Aegerter
Assistant Examiner—Stuart S. Levy
Attorney, Agent, or Firm—Louis J. Bachand

[57] ABSTRACT

A pool cover having solar energy heating capability is provided comprising sheet material adapted to furl about a reelless locus in a storage position and to be deployed in an extended position. The cover includes means continuously resiliently urging the sheet material into its furled position for storage, and means selectively overcoming and resisting said urging, comprising inflatable structure selectively inflated in sheet material deploying relation. The cover includes a wall portion responsive to solar energy to transfer heat to water, such as pool water, in contact therewith.

19 Claims, 7 Drawing Figures

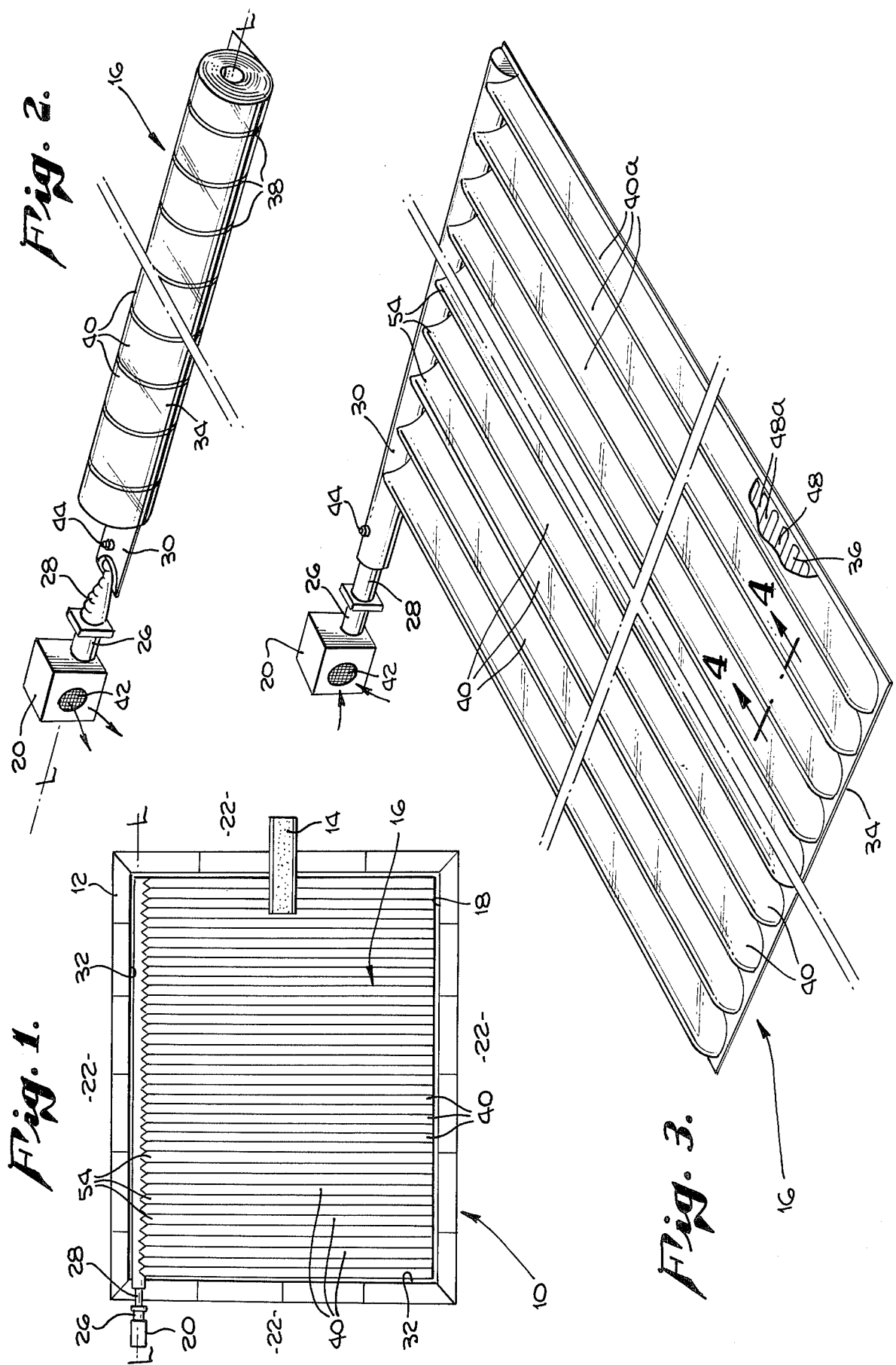

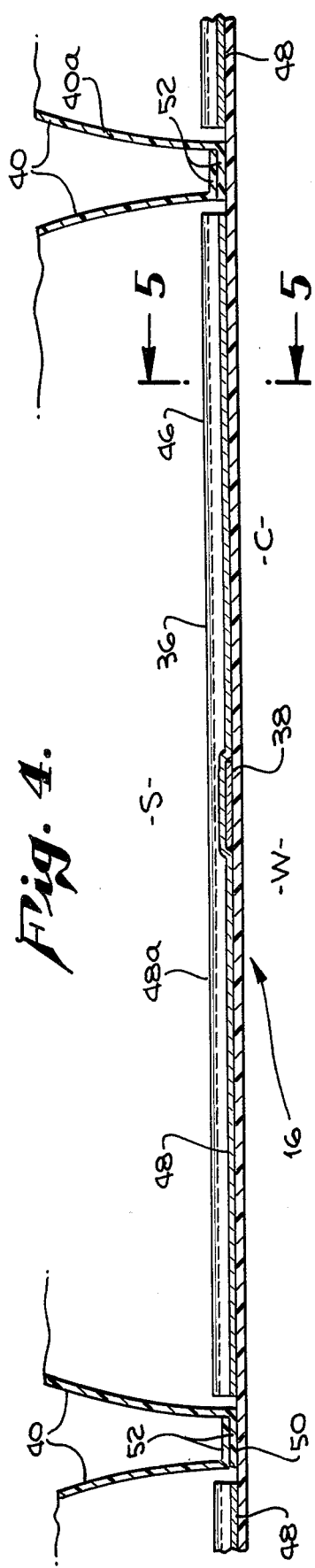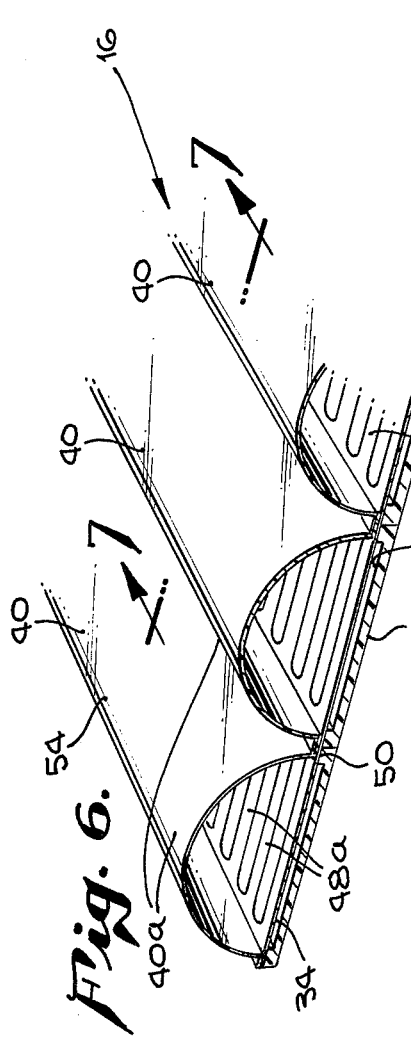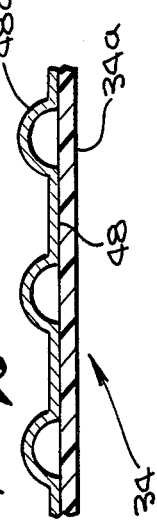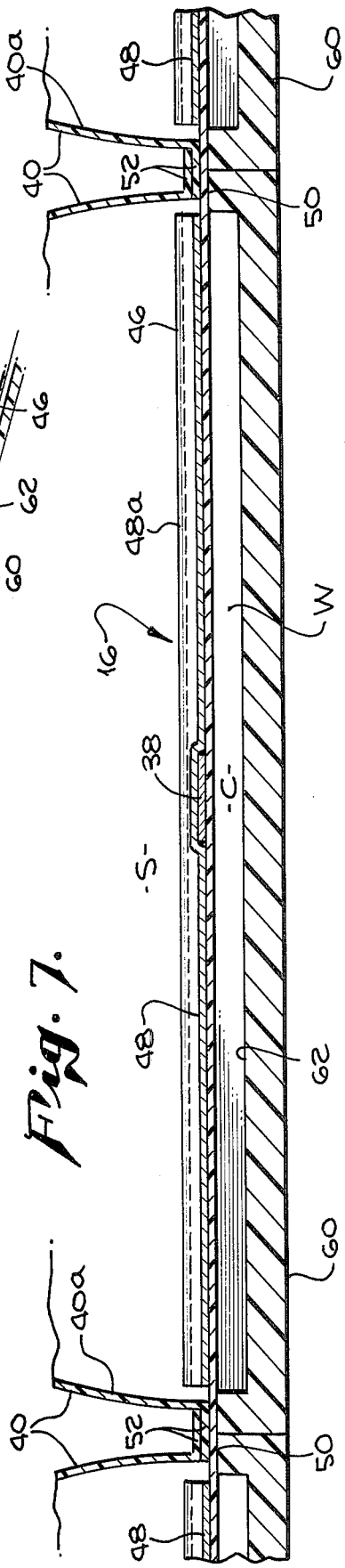

POOL COVER HAVING SOLAR ENERGY HEATING FEATURE

BACKGROUND OF THE INVENTION

This invention has to do with swimming pool covers and like covers for bodies of water or other areas desired to be protected from the environment, e.g. against evaporative loss, dilution through rain exposure, or loss of heat such as may be encountered in swimming pool maintenance. The invention further provides a positive heating device for swimming pools or other bodies of water, including domestic water supplies, by incorporating in the cover solar radiation responsive wall portions adapted to transfer heat to water in contact therewith. In particular aspects, the invention provides novel and highly advantageous means for alternately deploying and storing the pool cover in an expeditious and efficient manner requiring a minimum of manual effort, and free from cumbersome apparatus and mechanical interference with pool enjoyment. Cf. U.S. Pat. No. 3,885,255 to Vorbach et al.

The present invention, while termed a cover, is in a more specific sense directed to structure enabling the deployment and/or storage of sheet material. The sheet material during these periods may be employed as a cover for a swimming pool to prevent heat loss, may protect athletic fields or like areas from the elements, or may be merely a conduit for air or other gas to be heated for another purpose, or may be the support for a solar heating apparatus. Thus, the cover herein is to broadly construed as a structure having longitudinal and lateral extension which may be retracted into a furled condition on the one hand or extended fully or partly on the other.

With the foregoing in mind, the invention nonetheless will be described with respect to a highly advantageous use hereof, namely a swimming pool cover having the capability of solar radiation heating swimming pool water or other domestic water supply while protecting a swimming pool from incursions of contaminants such as leaves and dust, and at the same time inhibiting heat loss through water vaporization from the surface of the pool. As is well known, swimming pools are most comfortable when heated to slightly above the mean temperature encountered during the day. Indeed, it has been found that efforts to heat swimming pool water far in excess of the average daily mean temperature is disproportionately costly and in these energy conscious times, wasteful of a natural resource since most swimming pool heating heretofore has been accomplished by use of natural gas. Swimming pool covers without solar heating capability have been devised and marketed and have in large extent comprised a single reinforced sheet of plastic or canvas material which is extended over the pool surface, sometimes resting thereon, and tied at its perimeter. Such covers have been used for pool safety to prevent inadvertent falling into the pool, as well as to keep contaminants from entering into the pool. Such covers are particularly popular where the pool use is infrequent as in northeastern climates where a pool cover might remain on the pool for months at a time. In more pleasant climates, pool use is more frequent and the presence of covers is not favored because of the difficulty of removing and re-establishing covers upon the occasion of each pool use. Accordingly, some have proposed covers which lack the safety benefits of integral pool covers and which comprise a series of floats which can be formed into a pool cover and readily removed in whole or in part for pool use. Even these devices are cumbersome, however, particularly when weighted with water. The heat conservation aspects of swimming pool covers are preserved however by these devices, and some incorporate solar energy powered heaters. See U.S. Pat. Nos. 3,893,443 to Smith and 3,072,920 to Yellott.

Other types of sheet material structures designed primarily for solar heating of water passing thereacross may be adapted to swimming pool cover use, but the problem remains of ease of establishment and removal of the cover before and following use. In the absence of great convenience, the consumer will not tolerate a swimming pool cover, be it energy efficient, cost reducing, and safety useful; removal and re-establishment cannot be troublesome. Cf. U.S. Pat. Nos. 3,541,615 to Myrtha; 3,747,132 to Foster; 3,927,427 to Aine; and 3,574,979 to Chan.

It is, accordingly, an object of the present invention to provide a cover for swimming pool or like surface which is easily extended and retracted and which may incorporate solar heating features for the heating of pool water or other domestic water supply. Other objects of the invention include self-retraction capabilities in the cover, reelless furling of the cover, self-support of the cover when extended, solar heating capability in the cover for water in contact therewith, and the use of low cost, readily available materials which are deployable by one person without strain or undue time consumption.

SUMMARY OF THE INVENTION

These and other objects of the invention to become apparent hereinafter are accomplished in accordance with the present invention by the provision of the cover structure hereinafter to be described.

More specifically, the invention provides in a cover for a swimming pool or the like, adapted to furling about a storage locus and alternately adapted to planar deployment for use, means continuously resiliently biasing the cover into furled position about the locus, and means selectively deploying the cover against the mentioned bias into use position. The cover may comprise flexible water-resistant sheet material. The biasing means may comprise a plurality of spring fingers carried by the cover and normally coiled to resiliently exert a furling bias continuously against the cover. The cover further may include a wall portion adapted to continual water contact in solar radiation exposed relation, the wall portion being responsive to solar radiation to heat water in contact therewith. Typically, the cover will be employed in combination with a swimming pool, the cover being disposed to have a cover wall portion in pool water contact when the cover is in planar deployment, thereby to heat the pool water responsive to solar radiation exposure of the wall portion.

More particularly, the invention provides in a cover for a swimming pool or the like adapted to furling about a storage locus and alternately to planar deployment for use, means continuously biasing the cover into furled position about the locus and inflatable structure responsive to inflation to overbalance the bias and thereby deploy the cover into use position. In these and like embodiments the biasing means may comprise a plurality of spaced parallel spring fingers carried by the cover and normally coiled to resiliently exert a furling bias continuously against the cover. The mentioned inflatable structure may comprise longitudinally extended hollow rib means generally parallel to the spring fingers and include also a pressurized gas supply selectively communicable with the rib means, such as an air blower. The plural parallel rib means may be in paired opposed relation to the spring fingers. Accordingly the invention contemplates a cover including a wall portion underlying the inflatable structure and adapted to define water conduit means in solar radiation exposed relation, the wall portion being responsive to solar radiation to heat water in contact therewith.

In solar energy heating embodiments particularly, the inflatable structure may comprise a series of hollow, solar radiation transparent ribs extending parallel to each other and to the spring fingers, and extending normal to the storage locus, the cover including a wall portion underlying the inflatable structure in solar radiation receiving relation, the wall portion being adapted to partially define water conduit means and to heat water in contact therewith responsive to solar radiation reception. The invention further includes a water supply to be heated in progressive heat transfer circulation past the water conduit means defining wall portion. The water conduit means may include the side of the wall portion remote to the deflatable ribs, e.g. on the pool water surface, or the water conduit means may include a U-shape channel abutting the wall portion, pump means effecting water circulation therethrough. In either of these mentioned embodiments the wall portion may comprise a laminate of, e.g. corrugated or planar, lightweight and typically matte black metal, such as aluminum or other rollable metal sheet, and plastic sheet material, the spring fingers being metallic and confined within the wall portion laminate. Further contemplated is having the ribs define lens structure directing and concentrating received solar radiation onto the wall portion, e.g. as a plurality of parallel semicylinders extending longitudinally of and above the wall portion, which may be transversely corrugated, e.g. in its metal portion as a laminate.

In highly preferred embodiments there is provided a self-retracting pool cover having solar energy heating capability, the cover comprising water resistant flexible sheet material, dimensioned to cover the pool surface, self-retracting means attached to the sheet material, the self-retracting means comprising a plurality of normally coiled spaced and parallel individual spring steel fingers arranged throughout the length and breadth of the sheet material to resiliently urge the same to furl about a reelless locus at one end thereof, overlying the pool edge margin, extension structure carried by the sheet material comprising a series of solar radiation transparent, alternately inflatable and collapsible hollow and flexibly walled ribs generally parallel to the spring fingers and in paired opposed relation thereto, a common manifold adjacent the locus, the ribs terminating in said manifold, a reversing blower selectively communicating pressurized air to the ribs through the manifold to inflate the ribs to an inferior pressure sufficient to overcome and resist the coiling force of the spring fingers and extend the sheet material outward in pool surface-covering relation; and solar heating means underlying the ribs, said means comprising a wall portion of said sheet material laminated to a lightweight material in a manner embedding said spring steel fingers, the resultant water portion having heat response to solar radiation in heat transferring contact with pool water, the cover including the wall portion being furlable responsive to spring finger coiling about the mentioned locus for storage of the cover during pool use periods and responsive to blower reversal exhausting air from the inflatable rib structure. This highly preferred embodiment may further include the ribs defining solar heating means as lens structure adapted and arranged to concentrate solar radiation passing the ribs onto the wall portion.

In its solar water heating aspects the invention contemplates in a solar radiation powered water heater comprising sheet material adapted to furling about a storage locus and alternately to planar deployment for water heating, a sheet material wall portion adapted to continual water contact in solar radiation exposed relation and responsive to such radiation to heat water in contact therewith. This embodiment as in those hereinabove contemplates lens structure concentrating solar radiation onto the wall portion and means passing water in contact with the wall portion in heating relation as well as a plurality of spring fingers attached to the sheet material, e.g. embedded between the sheet material and a lightweight metal sheet laminated to the sheet material, effecting continuous resilient biasing of the sheet material into furled position about the locus. Additionally, the solar radiation water heater embodiments hereof contemplate means selectively deploying the sheet material from its furled position, the deploying means including inflatable structure responsive to inflation to deploy the sheet material, and a blower adapted to inflate the structure therefor.

BRIEF DESCRIPTION OF THE DRAWINGS

The invention will be further described as to several illustrative embodiments in conjunction with the attached drawings wherein:

FIG. 1 is a plan view of a swimming pool installation having a cover according to the invention in deployed position thereon.

FIG. 2 is a perspective view of the cover according to the invention furled to storage.

FIG. 3 is a perspective view of the cover according to the invention deployed as for pool covering purposes.

FIG. 4 is a fragmentary view in transverse section taken on line 4—4 in FIG. 3.

FIG. 5 is a fragmentary view taken in longitudinal section along line 5—5 in FIG. 4.

FIG. 6 is a perspective view of an alternative embodiment of the invention and specially adapted to heating water being circulated from place to place and during the water transit.

FIG. 7 is a view like FIG. 4 and taken on line 7—7 in FIG. 6.

DESCRIPTION OF THE PREFERRED EMBODIMENTS

It will be apparent from the foregoing that numerous highly advantageous features have been provided in a single cover structure, e.g:

1. Self-retracting capability, for ease of operation;
2. Reelless storage to avoid rollers, hand-cranks and like mechanisms adjacent the pool;
3. Blower-powered inflation and deflation for deployment or storage, again easing operation;
4. Endwise free deployment, to avoid guide ropes, chains and like mechanisms alongside the pool;

5. Low cost materials; conventional plastic and lightweight metal components are used in a low assembly cost manner;
6. Integral solar heating effect, useful per se or in a pool cover situation;
7. Solar radiation concentration for improved heating results at various sun angles;
8. Improved heat transfer through materials selection;
9. Alternative water conduit definitions for various use purposes.
10. Energy efficiency in keeping pool heat in and adding thereto when sun exposed.

These and like features and advantages of the invention enumerated above and to become apparent as the description proceeds will be better understood from a consideration of the attached drawings in which FIGS. 1 – 5 depict an embodiment of the invention most highly adapted to swimming pool cover and heat applications; and FIGS. 6 and 7 an embodiment useful for transitory water and gas heating e.g. in a rooftop installation.

Turning now to the drawings in detail, in FIG. 1 a rectangular swimming pool 10 having perimetrical coping 12 and diving board 14 is provided with a cover 16 according to the invention. The cover 16 is shown deployed, extended in pool water body 18 covering position, with reversible air blower 20, at pool edge margin 22 communicating with inflated ribs 40 through flanged fitting 26, flexible hose coupling 28 and manifold 30; the manifold and blower being coaxial with each other and parallel with the axis L of the furling locus of the cover at the inner pool edge margin 32 just within the pool coping 12. The outer pool edge margin 22 at and just beyond coping 12 may likewise locate the furling locus of cover.

With reference now particularly to FIGS. 2 and 3, the cover 16 alone is depicted for greater clarity of understanding of the cover assembly and its operation. Initially, and proceeding directly from the position shown in FIG. 1, the position shown in FIG. 3 is of the cover 16 extended, while in FIG. 2 that same cover has been retracted.

Before going into the details of the extension and self-retraction operation, the cover 16 assembly will be described. Cover 16 comprises a sheet material base 34 which is water resistant sufficiently for continual water contact, tough to be resistant to puncturing and rupture, chemically inert so as to not affect pool water chemistry or be affected by pool water chemicals, weathering resistant against UV and ozone degradation, heat resistant at least within the range of solar heating temperatures, air and liquid impervious, dimensionally stable, heat transfer capable, flexible, lightweight and low in cost. Base sheet material 34 is typically a calenderable thermoplastic such as polyolefin plastic e.g. vinyl or rubber-styrene polymer, of a thickness of from about 20 to 65 mils, or more or less, providing the enumerated characteristics are preserved.

The base sheet material 34 may be and preferably is laminated to a lightweight metal layer 36 e.g. light aluminum sheet or heavy foil for example 15 to 100 mils in thickness, and thus the base sheet material 34 comprises both a metal layer 36 and a plastic layer as will be explained in more detail hereinafter.

Secured to the base sheet material 34 for purposes of self-retraction of the cover is a plurality of nomally coiled, longitudinally extended parallel and laterally spaced spring steel members, termed spring fingers 38 herein, which extend normal to the locus having the axis L and thus continually bias the cover sheet material into furled position about the locus. See FIG. 2. The cover 16 self-retraction capability or function is a response to the tendency of the spring fingers 38 to coil, and exists at all times in the cover, resulting in furling, unless an opposite and at least equal or overbalancing force is then being currently applied.

For the purpose of applying such a force, the present cover 16 has, surmounting the base sheet material 34, a series of hollow, alternately inflatable and collapsible, semi-cylindrical, longitudinally extended ribs 40 which are shown in parallel, extending normal to the cover furling locus at L and in paired, opposed relation to the spring fingers 38 centered therebelow. See FIG. 4. As such, the ribs 40 are arranged and adapted, upon inflation by blower 20 to unroll the cover 16 against the resiliently urged force of spring fingers 38 to flatten the cover into pool 18 covering position as in FIG. 7. The ribs 40 provide the further advantage of trapping insulative air above the pool surface (and base sheet 34) to enhance heat loss protection provided by the cover 16. In operation and as shown in FIG. 3, air enters grilled opening 42 of the reversible blower 20, is pressurized therein and passed through fitting 26, hose coupling 28 and into manifold 30 and past relief valve 44 thereon and into the ribs 40, progressively filling them and correspondingly unrolling the cover 16 against the force of spring fingers 38.

Reversal of blower 20 exhausts air from the ribs 40 ultimately back through grilled opening 42 of the blower, collapsing the ribs, and permitting the spring fingers 38 to reroll the cover 16 about its locus at L, to the position of FIG. 2.

With reference now to FIGS. 4 and 5 in particular, details of the cover 16 construction are shown. The base sheet material 34 or sheet underlayer 34a having laminated thereto an overlayer 46 comprising light aluminum sheet 36 laid in strips 48 defining therebetween sealing rows 50 wherein the flanges 52 of rib 40 are overlaid on one another and sealed (by solvent, heat or dielectrically) or otherwise air-tightly secured to each other and to the underlayer sheet 34a.

As noted above, prior to laminating the ribs 40 in place, and the aluminum sheet strips 48 to the plastic underlayer 34a, the spring finger 38 is positioned between the plastic underlayer and the metal overlayer, and secured as necessary for assembly of the cover 16. In solar heating embodiments the aluminum sheet strip 48 is preferably matte black or otherwise rendered preferentially heat absorptive. Of course, the base sheet underlayer 34a may likewise be black. The use of a good heat transfer material such as a metal, and particularly aluminum, is an advantage in maximizing heat transfer to the water located at W confined in the conduit C partly defined by the base sheet material 34 and partly by the pool 18 walls.

A further advantage in the use of metal strips 48 as an overlayer derives from the greater longevity of metallic materials in sun-exposed situations, as compared with plastic film, e.g. at 34a. This attribute of metals is even more highly important when considering the solar radiation concentration feature provided by the ribs 40 in accordance with the invention.

Thus, and with reference to FIGS. 4 and 5, the ribs 40 have solar radiation transparent walls 40a and are suitably made of vinyl or acrylic plastic. A "greenhouse" effect obtains in the space S confined by the ribs 40. Ribs 40 are desirably athwart the sun's rays to act as solar radiation concentrators and for this purpose are formed to define a a plurality of transversely disposed (relative to the sun), semi-cylindrical lens structures to present an array of arcuate lenses 54 to the incident solar radiation deflecting and guiding incident energy toward corregations 48*a* defined by parallel undulations in the overlayer strip 48. The lens effect of ribs 40 not only concentrates solar radiation during the optimum part of the day, but increases the effectiveness of received radiation as the sun's rays angle of incidence varies during the day, in effect extending the optimum period of operation. Since most pools have not been laid out with an eye toward efficiency in using the solar radiations, it is desirable to provide a multitude of lens structures 54 to usefully capture as much of the sun's energy as reasonably possible, given the various orientations of existing pool installations and the periodic cycling of the earth relative to the sun. Additionally the cover can be custom created for a given pool to optimize the orientations of the lens structure 54 for an installation, the manifold 30 being positioned to permit such optimum orientation, at the side, end or center, etc., of the cover 16. The lens structures 54 are preferably formed of vinyl, acrylic or like plastic which is solar radiation tolerant, and undulantly formable into arcuate shapes securable between the strips 48 as by heat sealing, solvent welding or dielectrically.

It will now always be desired to cover, even occasionally, a swimming pool surface, although the water heating effect is wanted. In such situations an alternative form of the invention, shown in FIGS. 6 and 7 may be employed. With reference to FIGS. 6 and 7 wherein like parts to FIGS. 1 – 5 have like numerals essentially, the embodiment shown in these Figures defines the conduit C for water W to be heated with channel members 60 sized and arranged to convey water, be it pool water or other domestic or industrial use water, past the underlayer 34*a* and in heat transferring relation with overlayer strip 48. It will be observed that a U-shaped channel 62 formed by plastic, metal or like channel member 60 is abutted to the base sheet 34 and secured there to provide conduit C for water W, keeping the water in heat transfer contact with the laminate of underlayer 34*a* and overlayer strip 48 comprising the base sheet material. Since the water in conduit C is thus confined by the channel members 60, the water supply may be located remotely to the cover 16. Advantageously the cover 16 may be located on a rooftop for maximum solar radiation exposure, for use in repetitive heating of pool water, or in once-through heating of domestic hot water supply. The base sheet underlayer 34 may be omitted where the corrugated overlayer 48 is adequately noncorrosive for direct water contact, particularly in rooftop or other essentially stationary installations where the retraction and reeling features are not required.

Other fluids may be confined in the conduit for other, and specific heating purposes e.g. heating of air for tobacco curing barns. In these and like embodiments, the cover 16 functions essentially solely as a solar powered heater while the ease of retraction and extension enables ready deployment when needed and easy storage at other times, the cover being thus protected from unnecessary exposure to the elements and more long-lived as a result.

I claim:

1. In a cover for a swimming pool adapted to furling about a storage locus and alternatively to planar deployment for use, said cover comprising flexible, water resistant sheet material, biasing means comprising a plurality of spaced parallel spring fingers carried by the cover and normally coiled to resiliently exert a furling bias continuously against said cover into furled position about said locus, and inflatable structure responsive to inflation to overbalance said bias and deploy said cover into use position thereby, said inflatable structure comprising a series of hollow, solar radiation transparent ribs extending parallel to each other and to said spring fingers and normal to said storage locus, said cover including a wall portion underlying said inflatable structure in solar radiation receiving relation partially defining water conduit means and responsive to solar radiation reception to heat water in contact therewith.

2. In combination, a swimming pool and the cover claimed in claim 1 disposed to have said cover wall portion in pool water contact when said cover is in planar deployment to heat said pool water responsive to solar radiation exposure of said wall portion.

3. Cover according to claim 1 including also a pressurized gas supply selectively communicable with said ribs.

4. Cover according to claim 3 in which pressurized gas supply is an air blower.

5. Cover according to claim 3 including plural parallel rib means in paired opposed relation to said spring fingers.

6. Cover according to claim 1 in combination with a water supply to be heated circulating past said water conduit means in contacting relation.

7. Cover according to claim 6 including also pump means effecting said water circulation.

8. Cover according to claim 6 in which said water conduit means includes the side of said wall portion remote to said inflatable ribs.

9. Cover according to claim 1 in which said water conduit means includes a U-shape channel abutting said wall portion.

10. Cover according to claim 1 in which said spring fingers are metallic and confined within said wall portion.

11. Cover according to claim 10 in which said ribs define lens structure directing received solar radiation onto said wall portion.

12. Cover according to claim 11 in which said lens structure comprises a plurality of parallel semicylinders.

13. Cover according to claim 1 in which said ribs define lens structure directing received solar radiation onto said wall portion.

14. Cover according to claim 13 in which said wall portion is transversely corrugated and said lens structure comprises a plurality of parallel semicylinders extending longitudinally of and above said wall portion.

15. Cover according to claim 14 in which said wall portion comprises a laminate of plastic sheet material and corrugated aluminum sheet.

16. Cover according to claim 1 in which said cover wall portion comprises a laminate of plastic sheet material, said spring fingers and a transversely corrugated metal sheet.

17. Cover according to claim 16 including also inflatable ribs defining parallel, semicylindrical lens structure extending longitudinally of said wall portion.

18. A self-retracting pool cover having solar energy heating capability, said cover comprising water resistant, flexible sheet material dimensioned to cover the pool surface, self-retracting means attached to the sheet material, said self-retracting means comprising a plurality of normally coiled spaced and parallel individual spring steel fingers arranged throughout the length and breadth of said sheet material to resiliently urge the same to furl about a reelless locus at one end thereof overlying the pool edge margin, extension structure carried by the sheet material comprising a series of solar radiation transparent, alternately inflatable and collapsible, hollow and flexibly-walled ribs generally parallel to said spring fingers and in paired opposed relation thereto, a common manifold adjacent said locus, said ribs terminating in said manifold, a reversing blower selectively communicating pressurized air to said ribs through said manifold to inflate the ribs to an interior pressure sufficient to overcome and resist the coiling force of said spring fingers and extend the sheet material outward in pool surface-covering relation; and solar heating means underlying said ribs, said means comprising a wall portion of said sheet material having heating-response to solar radiation and in heat transferring contact with pool water, said cover including said wall portions being furlable responsive to spring finger coiling about said locus for storage during pool use periods responsive to blower reversal exhausting air from said ribs.

19. Self-retracting pool cover according to claim 18 in which said ribs define lens structure concentrating solar radiation passing said ribs onto said wall portion.

* * * * *